(12) United States Patent
Miller et al.

(10) Patent No.: US 8,099,203 B2
(45) Date of Patent: Jan. 17, 2012

(54) METHOD TO AUTOSTART AN INTERNAL COMBUSTION ENGINE IN A HYBRID POWERTRAIN SYSTEM

(75) Inventors: Jon C. Miller, Fenton, MI (US); Kelly T. Jozefowicz, Highland, MI (US); Mark D. Carr, Fenton, MI (US); Steven J. Shepherd, Commerce, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 347 days.

(21) Appl. No.: 12/127,152

(22) Filed: May 27, 2008

(65) Prior Publication Data

US 2009/0299586 A1    Dec. 3, 2009

(51) Int. Cl.
*B60L 11/00* (2006.01)
*B60W 10/06* (2006.01)
*B60K 1/00* (2006.01)

(52) U.S. Cl. ............... 701/22; 180/65.28; 180/65.265
(58) Field of Classification Search .......... 701/54; 180/65.1–65.8
See application file for complete search history.

(56) References Cited

U.S. PATENT DOCUMENTS

| | | | |
|---|---|---|---|
| 2005/0241619 A1* | 11/2005 | Strayer et al. | 123/478 |
| 2008/0066718 A1* | 3/2008 | Sato et al. | 123/350 |
| 2008/0257312 A1* | 10/2008 | Hasegawa et al. | 123/491 |
| 2009/0215586 A1* | 8/2009 | Kresse | 477/110 |

* cited by examiner

*Primary Examiner* — James Trammell
*Assistant Examiner* — Muhammad Shafi

(57) ABSTRACT

Internal combustion engine autostarting includes selecting from among several autostart processes in accordance with desired input torque from the engine to the transmission, cranking the engine, and fueling the engine during the engine cranking based upon the selected engine autostart process.

14 Claims, 5 Drawing Sheets

METHOD TO AUTOSTART AN INTERNAL COMBUSTION ENGINE IN A HYBRID POWERTRAIN SYSTEM

TECHNICAL FIELD

This disclosure pertains to control systems for hybrid powertrains.

BACKGROUND

The statements in this section merely provide background information related to the present disclosure and may not constitute prior art.

Known powertrain architectures include torque-generative devices, including e.g., internal combustion engines and electric machines, which transmit torque, preferably through a transmission device, to an output member to propel a vehicle. A control system monitors various inputs from the vehicle and an operator and provides operational control of the powertrain, including controlling the transmission and the torque-generative devices, and regulating power interchange among the devices to manage outputs of the transmission, including torque and rotational speed.

During vehicle operation, it may be advantageous to operate the powertrain system with the internal combustion engine in an engine OFF state. Consequently, an efficient method for automatically starting (hereafter 'autostart') the internal combustion engine during ongoing vehicle operation is desirable.

SUMMARY

A powertrain includes an internal combustion engine mechanically connected to a transmission to transmit tractive power to a driveline. A method to control the powertrain includes commanding an engine autostart event during ongoing operation of the powertrain. A desired input torque from the engine to the transmission is determined and an engine autostart process based upon the desired input torque is selected. The engine is cranked and the engine is fueled during the engine cranking based upon the selected engine autostart process.

BRIEF DESCRIPTION OF THE DRAWINGS

One or more embodiments will now be described, by way of example, with reference to the accompanying drawings, in which.

DETAILED DESCRIPTION

Figure 1:
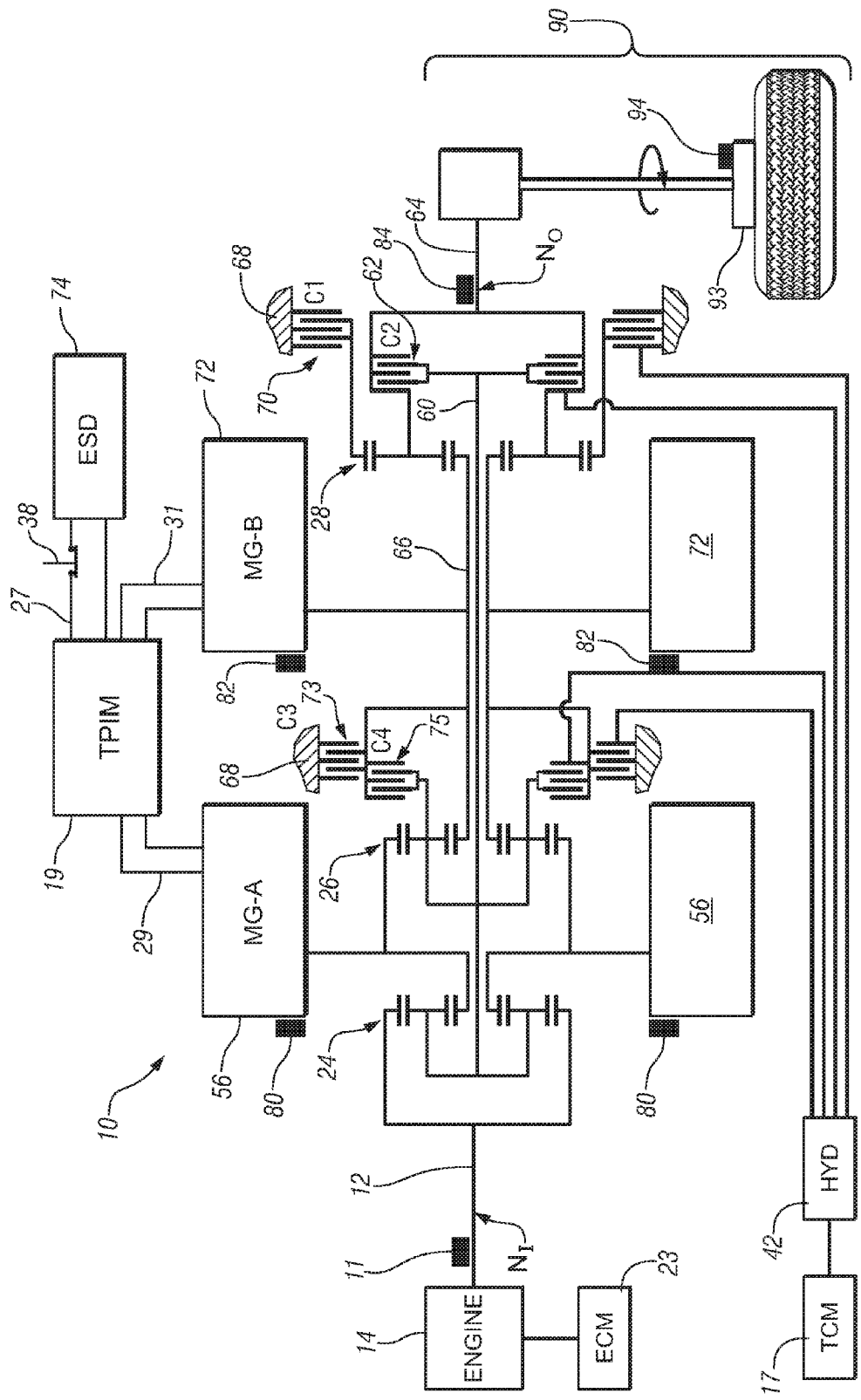
FIG. 1 is a schematic diagram of an exemplary powertrain, in accordance with the present disclosure.
Figure 2:
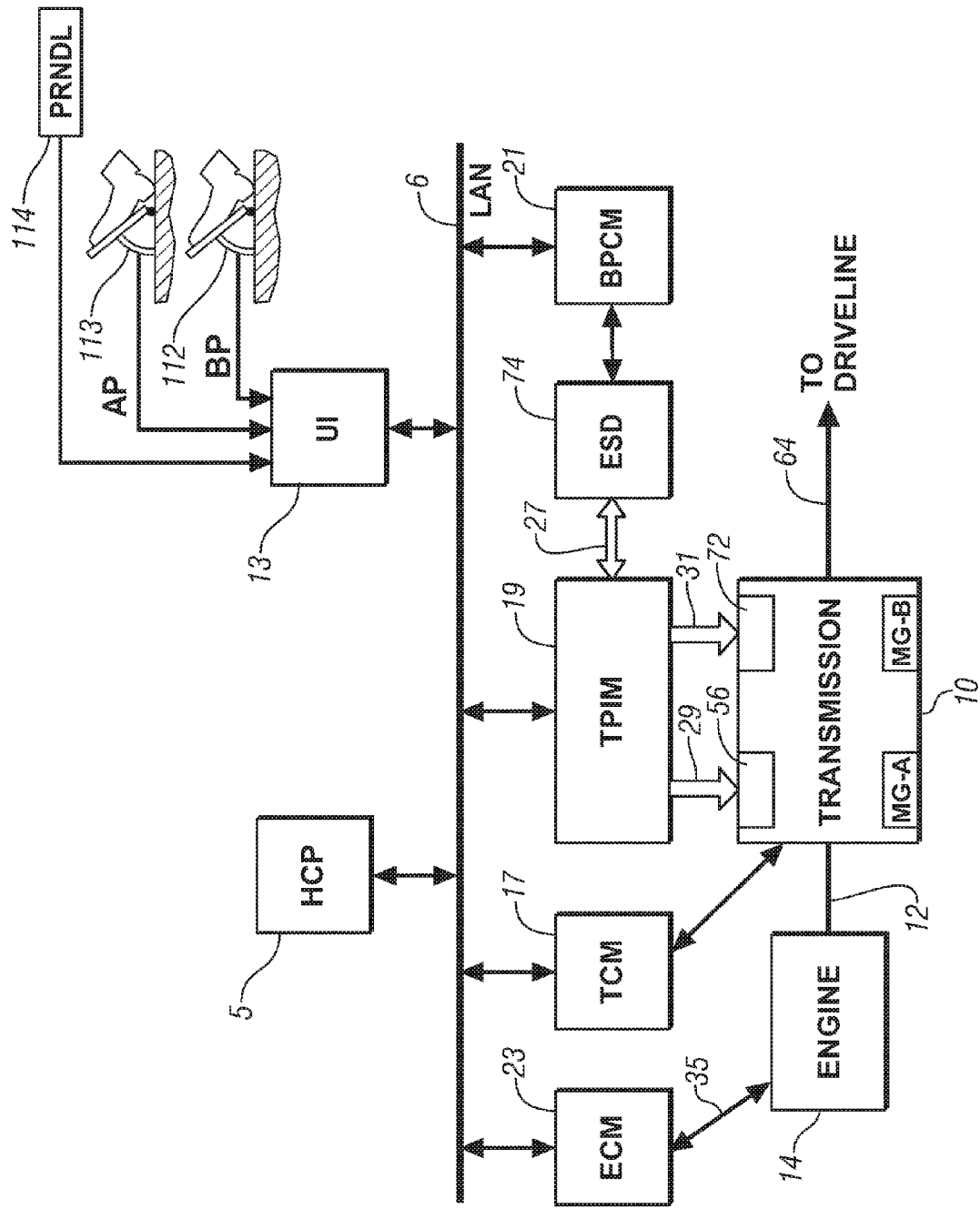
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10.

The hybrid powertrain shown in FIGS. 1 and 2 illustrates a exemplary powertrain system for which the process for autostarting an internal combustion engine described with reference to FIGS. 3-6 is applicable. One skilled in the art can readily apply the methods to other powertrain systems, including, e.g., various forms of electro-mechanical and hydro-mechanical powertrains.

The exemplary engine 14 comprises a multi-cylinder internal combustion engine selectively operative in several states to transmit torque to the transmission 10 via an input shaft 12, and can be either a spark-ignition or a compression-ignition engine. The engine states can include an engine on state ('ON') and an engine off state ('OFF'). The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., NA and NB, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to achieve the input torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via respective ones of the transfer conductors 29 and 31 and transform it to or from three-phase AC power, which is conducted to or from the first and second electric machines 56 and 72 for operation as motors or generators.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, No, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory, random access memory, electrically programmable read only memory, a high speed clock, analog to digital and digital to analog circuitry, and input/output circuitry and devices and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of the engine ON state and the engine OFF state, and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |

TABLE 1-continued

| Description | Engine State | Transmission Operating Range State | Applied Clutches | |
|---|---|---|---|---|
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft and the input member 12 are not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, NA and NB respectively, are dependent on internal rotation of the mechanism as defined by the clutching and are proportional to the input speed measured at the input shaft 12.

In response to the operator torque request $T_{O\_REQ}$ via the accelerator pedal 113 and brake pedal 112 as captured by the user interface 13, the HCP 5 and one or more of the other control modules determine the commanded output torque $T_{CMD}$ intended to meet the operator torque request $T_{O\_REQ}$ to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain, and the operator torque request. The transmission operating range state and the engine state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to transfer mechanical power to the output member 64.

Figure 3:
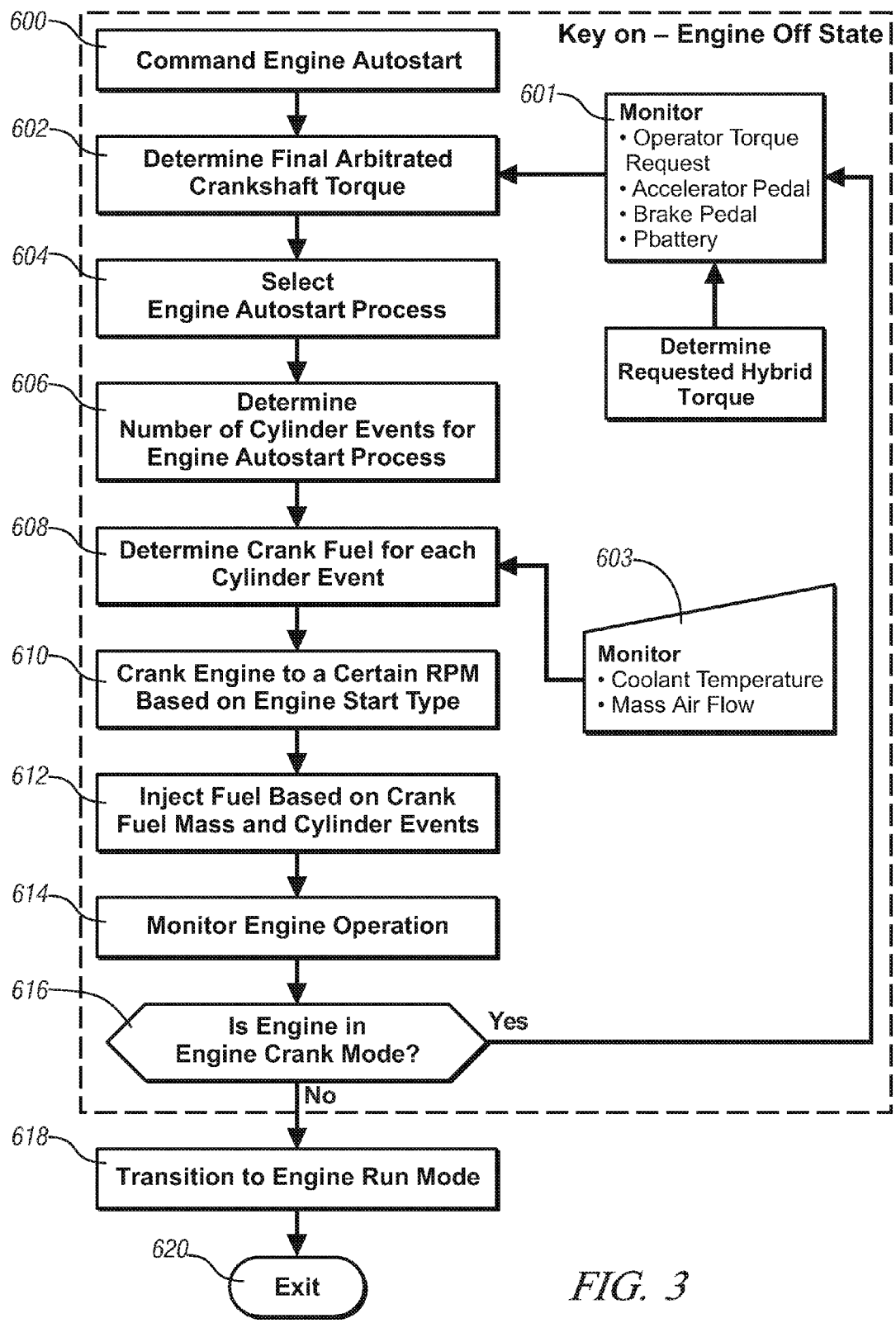
FIG. 3 is a control flowchart, in accordance with the present disclosure.

FIG. 3 shows a control flowchart of the autostart process starting from a key-ON, engine OFF state, an embodiment of which is described with reference to the powertrain system shown in FIGS. 1 and 2. During an engine start event, the HCP 5 commands the ECM 23 to start the engine 14 and coordinate control modules to operate the powertrain. The ECM 23 controls the engine actuator positions including throttle position, intake and/or exhaust valve timing and phasing, crank fuel mass injection, spark timing, and EGR valve position. The HCP 5 commands the TPIM 19 to control the first electrical machine 56 to spin the engine 14. Preferably, the prior crank position where the engine stopped relative to top-dead-center is known. The ECM 23 controls the crank fuel mass injection timing and ignition in cylinders based on the known prior crank position at engine shutoff and/or signal output from the rotational speed sensor 11. The ECM 23 determines the engine 14 is ON when the engine crankshaft speed, crank fuel mass, and spark timing are at or above predetermined thresholds in this embodiment. The ECM 23 controls the engine 14 to achieve the engine input torque.

During vehicle operation, the powertrain is in a key-ON state, the engine state is OFF, and the transmission 10 is operating in one of the operating range states described in Table 1. The HCP 5 monitors battery power parameters and the operator torque request to determine when autostarting the engine 14 is desirable. The HCP 5 commands the ECM 23 to command the engine 14 to transition to the engine ON state. This process is referred to as the engine autostart process (600).

The HCP 5 monitors the accelerator pedal 113 and brake pedal 112 to determine the operator torque request and monitors output from the BPCM 21 including battery state-of-charge (601). This monitoring is done continuously during ongoing operation of the powertrain. This monitoring is indicated in block 601 and is 'out of loop' to indicate that this monitoring occurs continuously during ongoing operation of the vehicle, and not just during the autostart process. A desired torque input from the engine 14 to the transmission 10, i.e., a final arbitrated crankshaft torque (602) is determined by an agreement among the HCP 5, the ECM 23, the BPCM 21, and the TCM 17 based upon the operator torque request, the ESD 74 state-of-charge, electrical power regeneration, parasitic torque sinks including road loads, and operational ranges of the engine 14, the first and second electrical machines 56 and 72, and the transmission 10.

The HCP 5 selects an engine autostart process based upon the final arbitrated crankshaft torque (604). Three engine autostart processes are described in the embodiment, comprising a smooth, a normal and an aggressive engine autostart process. The preferred engine autostart process is selected based upon the final arbitrated crankshaft torque (604). Each engine autostart process includes controlling actuators, cranking the engine 14 to a predetermined crankshaft speed, injecting a crank fuel mass during each cylinder event according to a predetermined crank fuel mass profile for a predetermined number of cylinder events, and detecting when the engine 14 is in the ON state. Controlling the actuators may include a throttle position, intake and/or exhaust valve timing and phasing when the engine 14 is so equipped, the crank fuel mass injection, spark timing, and EGR valve position, each of which is adapted based on the specific engine and engine type, e.g., one of compression ignition, spark-ignition, homogeneous-charge compression-ignition, and spark-ignition direct-injection engines. Torque applied to crank the engine 14 can change based upon the selected engine autostart process and can be accomplished using the first electrical machine 56 as in the present embodiment, or using a starter motor (not shown) in alternative embodiments. The engine autostart processes can be described in terms of a crank fuel mass profile ('Crank Fuel Mass'), a predetermined engine crankshaft speed ('RPM'), and a number of cylinder events during the autostart process.

Figure 4:
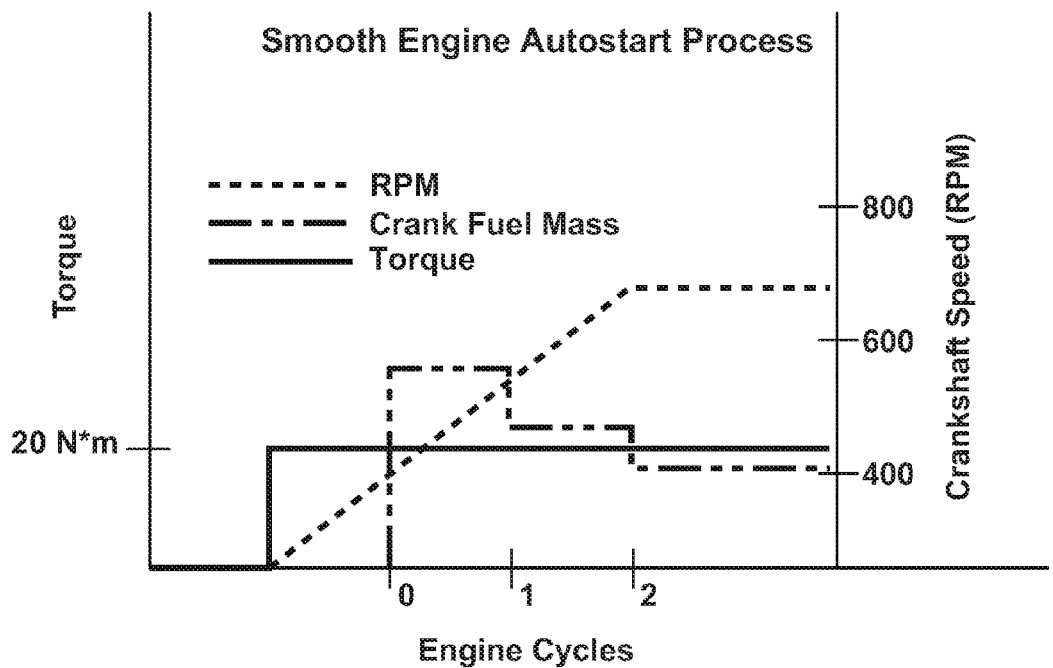
FIG. 4 graphically illustrates a smooth engine autostart process, in accordance with the present disclosure.

The smooth engine autostart process is preferably selected when the desired input torque from the engine 14 is unsubstantially used for transmitting tractive torque to the driveline, e.g., in situations for transmitting a required torque primarily to electrically charge the ESD 74, parasitic loads, and/or when the accelerator pedal 113 is not depressed. In the exemplary powertrain system, the smooth engine autostart process is selected when the final arbitrated crankshaft torque is less than about 20 N*m. FIG. 4 shows the smooth engine autostart process.

Figure 5:
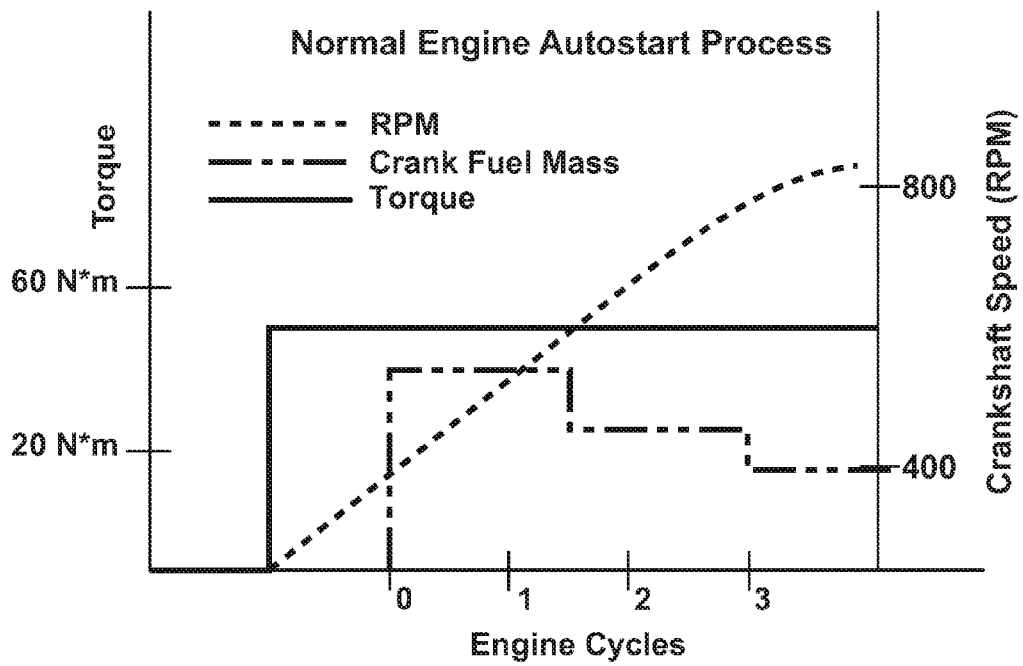
FIG. 5 graphically illustrates a normal engine autostart process, in accordance with the present disclosure.

The normal engine autostart process is preferably selected when the desired input torque from the engine 14 is primarily used for transmitting tractive torque to the driveline but at less than full accelerator pedal depression. In the exemplary powertrain system, a final arbitrated crankshaft torque between about 20 N*m and about 60 N*m initiates the normal engine autostart process. FIG. 5 shows the normal engine autostart process.

Figure 6:
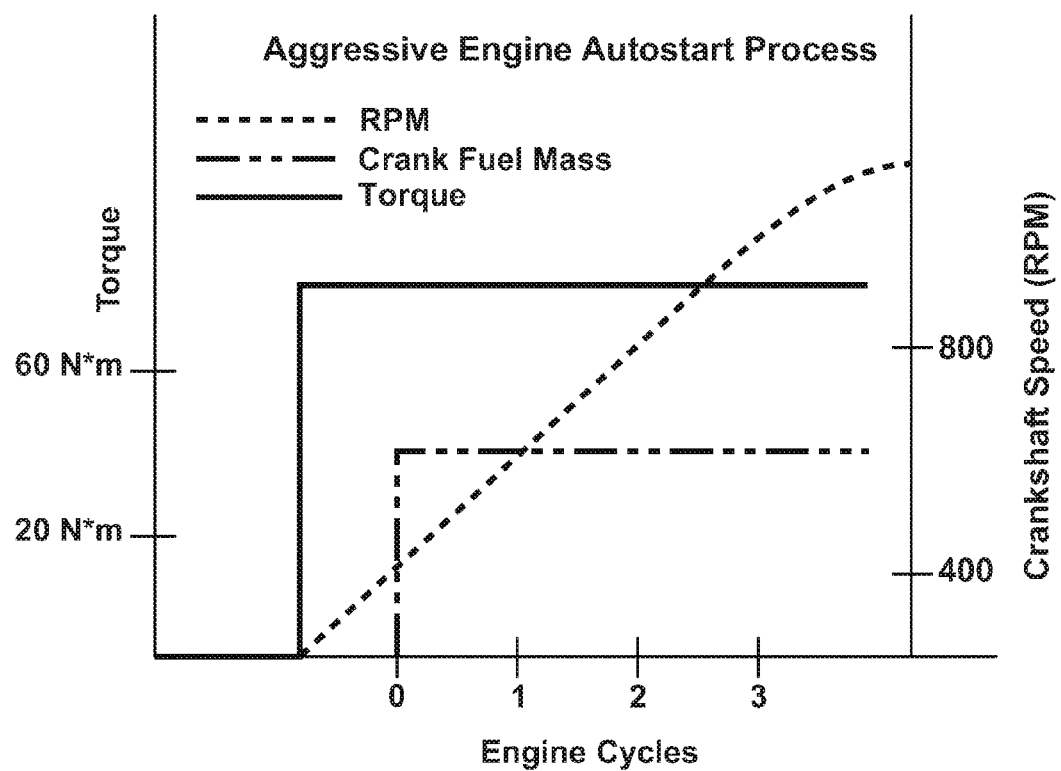
FIG. 6 graphically illustrates an aggressive engine autostart process, in accordance with the present disclosure.

The aggressive engine autostart process is preferably selected when the desired input torque from the engine 14 is primarily used for transmitting tractive torque to the driveline but at substantially full accelerator pedal depression. Wide open throttle conditions can initiate an aggressive engine autostart process. In the exemplary powertrain system, a final arbitrated crankshaft torque above about 60 N*m initiates the aggressive engine autostart process. FIG. 6 shows the aggressive engine autostart process.

After the engine autostart process is selected the HCP determines a number of cylinder events to conduct during the engine start (606). The number of cylinder events is a predetermined value and can be based upon the number of cylinders in the engine 14. The smooth engine autostart process comprises two engine cycles. The normal and aggressive engine autostart processes comprises three engine cycles.

After the number of cylinder events is determined, the crank fuel mass for each cylinder event is determined (608). The crank fuel mass injected during each cylinder event can be determined based upon sensor measurements, the engine autostart process fuel profile, lookup tables and equations stored in memory devices in one of the controller modules. A coolant temperature measurement (no shown) and intake mass air flow estimation are preferably used to determine the crank fuel mass (603). The coolant temperature measurement and intake mass air flow estimation are indicated in block 603 and are 'out of loop' to indicate that this monitoring is occurring continuously, not just during the autostart process. The lookup tables based upon the engine start process fuel profile and the number of cylinder events comprise stored data on measured coolant temperature and intake mass air flow and a corresponding crank fuel mass. Once the coolant temperature is measured and the intake mass air flow is determined, the values are located in the lookup table and the corresponding crank fuel mass is determined. This stored data may be experimentally determined and may be adapted during engine operation. The measurements and estimation can be continually updated as engine conditions change. The crank fuel mass can then be adapted for successive cylinder events.

Each of the engine autostart processes can have a different fuel profile as depicted in the exemplary autostart processes FIGS. 4, 5, and 6. FIG. 4 depicts an exemplary crank fuel mass profile for the smooth engine autostart process. The smooth engine autostart fuel profile comprises a maximum crank fuel for the first engine cycle and decreased crank fuel mass for successive engine cycles. FIG. 5 depicts an exemplary crank fuel mass profile for the normal engine autostart process. The normal engine autostart fuel profile comprises a maximum crank fuel for the first engine cycle and a few following cylinder events followed by decreased crank fuel mass for successive cylinder events. FIG. 6 depicts an exemplary crank fuel mass profile for the aggressive engine autostart process. The aggressive engine autostart fuel profile comprises a substantially maximum crank fuel mass for each of a number of cylinder events.

Block 610 initiates cranking of the engine 14. The engine can be cranked with either or both an engine starter (not shown) or the first electrical machine 56. The engine 14 is cranked to a predetermined engine crankshaft speed based upon the selected engine autostart process. Each of the engine autostart processes may have a different predetermined engine crankshaft speed to achieve prior to fueling the engine 14. After the engine 14 achieves the predetermined engine crankshaft speed, the crank fuel mass can be injected for each of the number of cylinder events (612). During engine cranking and crank fuel mass injection, engine operation is monitored (614).

During blocks (604) through (610) the HCP 5 monitors the accelerator pedal 113. When a change in accelerator pedal position 113 indicates an increase in an operator torque request has occurred, the final arbitrated crankshaft torque can be redetermined and the autostart process can restart at block (602). The change in operator torque request indicated by the acceleration pedal 113 increase is preferably significant enough to change engine autostart processes from the smooth engine autostart process to the normal or aggressive engine autostart processes or from the normal autostart process to the aggressive autostart process.

After completion of the number of cylinder events, a determination of whether the engine 14 is in crank mode can be made based upon the engine crankshaft speed, crank fuel mass, and spark timing (616). If the engine crankshaft speed, crank fuel mass, or spark timing are below predetermined thresholds, the engine 14 is still in crank mode and a new final arbitrated crankshaft torque can be determined based on the monitored engine conditions in block (601) and a new crank process can start again. The engine 14 is determined to be ON when the engine crankshaft speed, crank fuel mass, and spark timing are at or above predetermined thresholds and can transitions engine operation to engine run mode (618) and exit out of the Key-ON engine OFF state if the thresholds have been achieved (620). The ECM 23 then controls the engine input torque.

As stated above, the same methods as described hereinabove are applicable to engine starts operative in other powertrain systems having operating schemes that include automatically stopping and starting the engine during ongoing operation of the powertrain. Another exemplary powertrain system comprises a belt alternator starter ('BAS') system. In the BAS system, an engine can be shut OFF during stops and then started for a battery recharge and multiple acceleration situations. The electrical motor may be used to recharge the battery or to provide torque mechanically through the engine during engine acceleration. In each of these situations an engine start process may be selected based upon the desired operator torque. This can include powertrains using electromechanical, and hydro-mechanical, and other transmission systems.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for controlling a powertrain including an internal combustion engine mechanically connected to a transmission to transmit tractive power to a driveline, the method comprising:
    commanding an engine autostart event from an engine off state during ongoing operation of the powertrain;
    determining a desired input torque from the engine to the transmission;
    selecting an engine autostart process based upon the desired input torque, the selected engine autostart process including a respective crank fuel mass profile predetermined for the selected engine autostart process and a predetermined number of cylinder events to conduct during the selected engine autostart process;
    determining an injected crank fuel mass for each of the predetermined number of cylinder events, the injected crank fuel mass adaptive for successive cylinder events and defined by the respective crank fuel mass profile predetermined for the selected engine autostart process;
    cranking the engine; and
    fueling the engine during the engine cranking according to the injected crank fuel mass for each of the predetermined number of cylinder events and defined by the respective crank fuel mass profile predetermined for the selected engine autostart process.

2. The method of claim 1, further comprising:
    determining the desired input torque from the engine to the transmission based upon an operator torque request and a state of charge of a battery electrically connected to transmit power to the powertrain; and
    selecting the engine autostart process comprising one of a smooth engine autostart process, a normal engine autostart process, and an aggressive engine autostart process based upon the desired input torque.

3. The method of claim 2, further comprising selecting the aggressive engine autostart process when the desired input torque from the engine is primarily used for transmitting tractive torque to the driveline corresponding to a substantially fully depressed accelerator pedal.

4. The method of claim 3, wherein selecting the aggressive engine autostart process further comprises selecting the aggressive engine autostart process when the desired input torque is greater than about 60 N*m.

5. The method of claim 3, further comprising:
    cranking the engine to a predetermined speed; and
    fueling the engine according to the injected crank fuel mass for each of the predetermined number of cylinder events defined by the respective crank fuel mass profile predetermined for the aggressive engine autostart process.

6. The method of claim 1, further comprising:
cranking the engine to a predetermined speed; and
fueling the engine according to the injected crank fuel mass for each of the predetermined number of cylinder events defined by a respective crank fuel mass profile predetermined for the selected engine autostart process.

7. The method of claim 6, further comprising fueling the engine at a substantially maximum crank fuel mass for each cylinder event when an aggressive engine autostart process is selected.

8. A method for controlling a powertrain comprising an electro-mechanical transmission mechanically-operatively coupled to an internal combustion engine and first and second electric machines to transmit mechanical power to an output member, the method comprising:
commanding an engine autostart event from an engine off state during ongoing operation of the powertrain;
determining a desired input torque from the engine to the transmission;
selecting an engine autostart process based upon the desired input torque, the selected engine autostart process including a respective crank fuel mass profile predetermined for the selected engine autostart process and a predetermined number of cylinder events to conduct during the selected engine autostart process;
determining an injected crank fuel mass for each of the predetermined number of cylinder events, the injected crank fuel mass adaptive for successive cylinder events and defined by the respective crank fuel mass profile predetermined for the selected engine autostart process;
cranking the engine; and
fueling the engine during the engine cranking according to the injected crank fuel mass for each of the determined number of cylinder events and defined by the respective crank fuel mass profile predetermined for the selected engine autostart process.

9. The method of claim 8, further comprising:
determining the desired input torque from the engine to the transmission based upon an operator torque request and a state of charge of a battery electrically connected to transmit power to the powertrain; and
selecting the engine autostart process comprising one of a smooth engine autostart process, a normal engine autostart process, and an aggressive engine autostart process based upon the desired input torque.

10. The method of claim 9, further comprising selecting the aggressive engine autostart process when the desired input torque from the engine is primarily used for transmitting tractive torque to the driveline corresponding to a substantially fully depressed accelerator pedal.

11. The method of claim 10, further comprising:
cranking the engine to a predetermined speed; and
fueling the engine according to the injected crank fuel mass for each of the predetermined number of cylinder events defined by a respective crank fuel mass profile predetermined for the aggressive engine autostart process.

12. The method of claim 8, further comprising:
cranking the engine to a predetermined speed; and
fueling the engine according to the injected crank fuel mass for each of the predetermined number of cylinder events defined by a respective crank fuel mass profile predetermined for the selected engine autostart process.

13. The method of claim 12, further comprising fueling the engine at a substantially maximum crank fuel mass for each of the predetermined number of cylinder events when an aggressive engine autostart process is selected.

14. A method for controlling an internal combustion engine mechanically-operatively connected to an electro-mechanical transmission, the method comprising:
commanding an engine autostart event from an engine off state during ongoing operation of the powertrain;
determining a desired input torque from the engine to the transmission;
selecting an engine autostart process based upon the desired input torque, the selected engine autostart process including a respective crank fuel mass profile predetermined for the selected engine autostart process and a predetermined number of cylinder events to conduct during the selected engine autostart process;
determining an injected crank fuel mass for each of the predetermined number of cylinder events, the injected crank fuel mass adaptive for successive cylinder events and defined by the respective crank fuel mass profile predetermined for the selected engine autostart process;
cranking the engine;
fueling the engine during the engine cranking according to the injected crank fuel mass for each of the determined number of cylinder events and defined by the respective crank fuel mass profile predetermined for the selected engine autostart process;
wherein selecting an engine autostart process based upon the desired input torque includes
selecting a smooth engine autostart process when the desired input torque from the engine is unsubstantially used for transmitting tractive torque to the driveline, the desired input torque from the engine is unsubstantially used for transmitting tractive torque to the driveline when the desired input torque is less than about 20 N*m,
selecting a normal engine autostart process when the desired input torque from the engine is primarily used for transmitting tractive torque to the driveline corresponding to a less than substantially fully depressed accelerator pedal, and
selecting an aggressive engine autostart process when the desired input torque from the engine is primarily used for transmitting tractive torque to the driveline corresponding to a substantially fully depressed accelerator pedal.

* * * * *